(12) United States Patent
Kamalavannan

(10) Patent No.: US 7,757,113 B2
(45) Date of Patent: Jul. 13, 2010

(54) ENHANCED RAID LEVEL 3

(75) Inventor: Hariharan Kamalavannan, Chennai (IN)

(73) Assignee: LSI Corporation, Milpitas, CA (US)

( * ) Notice: Subject to any disclaimer, the term of this patent is extended or adjusted under 35 U.S.C. 154(b) by 355 days.

(21) Appl. No.: 12/033,029

(22) Filed: Feb. 19, 2008

(65) Prior Publication Data

US 2009/0210744 A1    Aug. 20, 2009

(51) Int. Cl.
G06F 11/00    (2006.01)
(52) U.S. Cl. .................................................. 714/6
(58) Field of Classification Search ............... 714/6, 714/770
See application file for complete search history.

(56) References Cited

U.S. PATENT DOCUMENTS 5,790,774 A * 8/1998 Sarkozy ...................... 714/6

2005/0036381 A1 * 2/2005 Hassner et al. ............. 365/222
2009/0113235 A1 * 4/2009 Selinger ........................ 714/6
2010/0037118 A1 * 2/2010 Saliba et al. ................ 714/752
2010/0050015 A1 * 2/2010 Corbett et al. ................ 714/6

* cited by examiner

*Primary Examiner*—Bryce P Bonzo
(74) *Attorney, Agent, or Firm*—Raj Abhyanker, PC

(57) ABSTRACT

A method and system of method and system of enhanced RAID level 3 is disclosed. In one embodiment, a method includes allocating three times a physical storage capacity of a data drive to a dedicated parity drive of a 'n' physical drives of a redundant array of independent disks, recovering n–1 physical drive failures of the 'n' physical drives through a parity-in-parity technique in which certain number of parities generated during an initial write of data may be physically stored and using an XOR function applied to the stored parities to recreate un-stored parities which enable recovery of the n–1 physical drive failures. The method may include creating a superior read/write access capability and/or a superior parity data redundancy through the mirroring. The method may also include recreating the un-stored parities after a time interval that may be specified by a user.

20 Claims, 9 Drawing Sheets

USING THE XOR TABLE (FIGURE 4) THE VALUES OF P2 XOR P4 AND P3 XOR P5 REMAINS THE SAME, SO ONLY ONE VALUE IS USED.   — 502
USING THESE UNIQUE PROPERTIES OF XOR FUNCTION THE BOOLEAN EXPRESSION IS FORMED

```
EXAMPLE:-
DATA: - 1010
ASSUMING THAT THE FIRST THREE DISKS ARE LOST AND DATA NEEDS TO BE REGENERATED,
THE CALCULATION AS FOLLOWS:-

D1  D2  D3  D4
X   X   X   0
P2 = D1 XOR D2 = 1
P3 = D3 XOR D4 = 1
P4 = D1 XOR D3 = 0
P5 = D2 XOR D4 = 0
P1 = P2 XOR P4 (OR) P3 XOR P5 = 1
```
— 504

| D1 | D2 | D3 | D4 | P2 | P3 | P4 | P5 | P2 XOR P4 | P3 XOR P5 |
|----|----|----|----|----|----|----|----|-----------|-----------|
| 1  | 0  | 1  | 0  | 1  | 1  | 0  | 0  | 1         | 1         |

— 506

TAKING THE PARITIES P1, P2 AND P5 FORM THE PARITY DISK, P3 AND P4 IS CALCULATED FROM P2 XOR P1 AND P5 XOR P1. FROM THE FOUR PARITY VALUES AND A DATA DISK (D4) REMAINING — 508 LOST DATA ARE REGENERATED

LEGEND

202 — (Y) – THE NUMBER OF PARITIES GENERATED DURING THE INITIAL WRITE OF DATA PHYSICALLY

204 — (X) – THE NUMBER OF PARITIES WHICH WILL BE VIRTUALLY CALCULATED AND WILL BE REGENERATED

206 — (N) – THE NUMBER OF DATA WRITTEN PHYSICALLY

208 — (Y-X) – THE NUMBER OF PARITIES WHICH WILL BE PHYSICALLY STORED

210 — (Y) NUMBERS PARITIES (IN THE ABOVE CASE P2, P3, P4, P5) ARE CALCULATED WITH (N) NUMBERS OF DATA WRITTEN

212 — (Y-X) NUMBERS OF PARITIES ARE STORED PHYSICALLY AND 'X' NUMBER OF PARITY (IN THE ABOVE CASE ITS P3, P4)

214 — THESE 'X' NUMBER OF PARITY IS TEMPORARILY STORED IN CACHE AND IS REGENERATED WHENEVER NECESSARY USING THE DATA DISKS AND PHYSICALLY STORED (Y-X) PARITIES

FIGURE 2

XOR TABLE:-

THESE ARE THE POSSIBLE DATA WHICH CAN BE WRITTEN IN THE 4 HARD DISKS

| D1 | D2 | D3 | D4 | P2 | P3 | P4 | P5 | P2 XOR P4 | P3 XOR P5 |
|---|---|---|---|---|---|---|---|---|---|
| 0 | 0 | 0 | 0 | 0 | 0 | 0 | 0 | 0 | 0 |
| 0 | 0 | 0 | 1 | 0 | 1 | 0 | 1 | 0 | 0 |
| 0 | 0 | 1 | 0 | 0 | 1 | 1 | 0 | 1 | 1 |
| 0 | 0 | 1 | 1 | 0 | 0 | 1 | 1 | 1 | 1 |
| 0 | 1 | 0 | 0 | 1 | 0 | 0 | 1 | 1 | 1 |
| 0 | 1 | 0 | 1 | 1 | 1 | 0 | 0 | 1 | 1 |
| 0 | 1 | 1 | 0 | 1 | 1 | 1 | 1 | 0 | 0 |
| 0 | 1 | 1 | 1 | 1 | 0 | 1 | 0 | 0 | 0 |
| 1 | 0 | 0 | 0 | 1 | 1 | 0 | 0 | 1 | 1 |
| 1 | 0 | 0 | 1 | 1 | 0 | 0 | 1 | 1 | 1 |
| 1 | 0 | 1 | 0 | 0 | 0 | 1 | 1 | 1 | 1 |
| 1 | 0 | 1 | 1 | 0 | 1 | 1 | 0 | 1 | 1 |
| 1 | 1 | 0 | 0 | 0 | 1 | 0 | 1 | 0 | 0 |
| 1 | 1 | 0 | 1 | 0 | 0 | 0 | 0 | 0 | 0 |
| 1 | 1 | 1 | 0 | 0 | 0 | 1 | 0 | 1 | 0 |
| 1 | 1 | 1 | 1 | 0 | 1 | 0 | 0 | 0 | 1 |

400

USING THE XOR TABLE (FIGURE 4) THE VALUES OF P2 XOR P4 AND P3 XOR P5 REMAINS THE SAME, SO ONLY ONE VALUE IS USED. — 502
USING THESE UNIQUE PROPERTIES OF XOR FUNCTION THE BOOLEAN EXPRESSION IS FORMED

EXAMPLE:-
DATA:- 1010
ASSUMING THAT THE FIRST THREE DISKS ARE LOST AND DATA NEEDS TO BE REGENERATED, THE CALCULATION AS FOLLOWS:-

D1  D2  D3  D4
X   X   X   0
P2 = D1 XOR D2 = 1
P3 = D3 XOR D4 = 1
P4 = D1 XOR D3 = 0
P5 = D2 XOR D4 = 0
P1 = P2 XOR P4 (OR) P3 XOR P5 = 1

— 504

| D1 | D2 | D3 | D4 | P2 | P3 | P4 | P5 | P2 XOR P4 | P3 XOR P5 |
|----|----|----|----|----|----|----|----|-----------|-----------|
| 1  | 0  | 1  | 0  | 1  | 1  | 0  | 0  | 1         | 1         |

— 506

TAKING THE PARITIES P1, P2 AND P5 FORM THE PARITY DISK, P3 AND P4 IS CALCULATED FROM P2 XOR P1 AND P5 XOR P1. FROM THE FOUR PARITY VALUES AND A DATA DISK (D4) REMAINING — 508 LOST DATA ARE REGENERATED

FIGURE 5

ENHANCED RAID LEVEL 3

FIELD OF TECHNOLOGY

This disclosure relates generally to the technical fields of storage technology and, in one example embodiment to a method, system and apparatus of enhanced RAID level 3.

BACKGROUND

RAID (Redundant Arrays of Independent Disks) may be an umbrella term for computer data storage schemes that divide and replicate data among multiple hard disk drives. RAID's various designs may balance or accentuate two key design goals: increased data reliability and increased I/O (input/output) performance. A number of standard schemes have evolved which are referred to as levels. There were five RAID levels originally conceived, but other variations have evolved.

A RAID (Redundant Arrays of Inexpensive Disks) level 3 algorithm uses byte-level striping with a dedicated parity disk. This mechanism provides an improved performance and fault tolerance (e.g., similar to RAID 5), but with the dedicated parity disk rather than rotated parity stripes. The dedicated parity disk (e.g., a single parity disk) can sometimes be a bottle-neck for writing since every write requires updating a parity data. A side-effect of RAID 3 is that it may not be able to service multiple requests simultaneously. Furthermore, the RAID 3 may be able to only recover up to one physical drive failure in one 'data volume group' (e.g., containing 'n' number of physical data drives and 1 drive for parity).

SUMMARY

A method, system and apparatus of enhanced RAID level 3 is disclosed. In one aspect, a method includes allocating three times a physical storage capacity of a data drive to a dedicated parity drive (e.g., may be part of a separate parity volume group having 'mirrored' physical drives) of a 'n' physical drives (e.g., may be of 4, 8, and 12 drives) of a redundant array of independent disks, recovering n−1 physical drive failures of the 'n' physical drives through a parity-in-parity technique in which only certain number of parities generated during an initial write of data (e.g., may be most critical at a reach point of the time interval) are physically stored and using an XOR function applied to the stored parities to recreate un-stored parities which enable recovery of the n−1 physical drive failures.

The method may include creating a superior read/write access capability and a superior parity data redundancy through the mirroring. In addition, the method may include recreating the un-stored parities after a time interval that may be specified by a user. The other aspects of the method may operate similarly to a RAID level 3 algorithm. The physical storage capacity may be three times the data drive of the dedicated parity drive when there are be four physical data drives, four times the data drive of the dedicated parity drive when there are six physical drives, and/or six times the data drive of the dedicated parity drive when there are eight physical drives.

In another aspect, a system of enhanced RAID level 3 includes a redundant array of independent disks to allocate three times a physical storage capacity of a data drive to a dedicated parity drive (e.g., may be part of a separate parity volume group having 'mirrored' physical drives), a cache (e.g., may store some parity data), a controller to split full width data into multiple smaller width data, a parity-in-parity module to recover n−1 physical drive failures of the 'n' physical drives (e.g., may be 4, 8, and 12 drives) through a parity-in-parity technique in which certain number of parities generated during an initial write of data (e.g., may be the most critical at a reach point of the time interval) may physically stored and a XOR module to apply XOR operation on the stored parities to recreate un-stored parities which enable recovery of the n−1 physical drive failures.

The system may include a regeneration module to recreate the un-stored parities after a time interval that may be specified by a user. In addition, the system may include a mirror module to create a superior read/write access capability and a superior parity data redundancy through the mirroring. The system may also include other aspects of the system operate similarly to a RAID level 3 algorithm.

The physical storage capacity may be three times the data drive of the dedicated parity drive when there are be four physical data drives, four times the data drive of the dedicated parity drive when there are six physical drives and/or six times the data drive of the dedicated parity drive when there are eight physical drives.

In yet another aspect, a method of a recovering n−1 physical drive failure includes applying a parity-in-parity technique to recover a redundant array of independent disks, applying a XOR function through the parity-in-parity technique to generate un-stored parity data from 'n' physical drives and stored parity data and recreating the un-stored parities after a time interval that may be specified by a user.

The method may include allocating three times a physical storage capacity of a data drive to a dedicated parity drive (e.g., may be part of a separate parity volume group having 'mirrored' physical drives) of the 'n' physical drives of the redundant array of independent disks. The method may also include creating a superior read/write access capability and/or a superior parity data redundancy through the mirroring.

The methods, system, and apparatuses disclosed herein may be implemented in any means for achieving various aspects, and may be executed in a form of machine-readable medium embodying a set of instruction that, when executed by a machine, causes the machine to perform any of the operation disclosed herein. Other features will be apparent from the accompanying drawing and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 2 is a process view illustrating various parameters, according to one embodiment.

FIG. 5 is an example view illustrating a single case taken from FIG. 4, according to one embodiment.

Other features of the present embodiments will be apparent from the accompanying drawings and from the detailed description that follows.

DETAILED DESCRIPTION

A method and system of enhanced RAID level 3 are disclosed. In the following description, for the purposes of explanation, numerous specific details are set forth in order to provide a thorough understanding of the various embodiments. It will be evident, however to one skilled in the art that the various embodiments may be practiced without these specific details.

Figure 1:
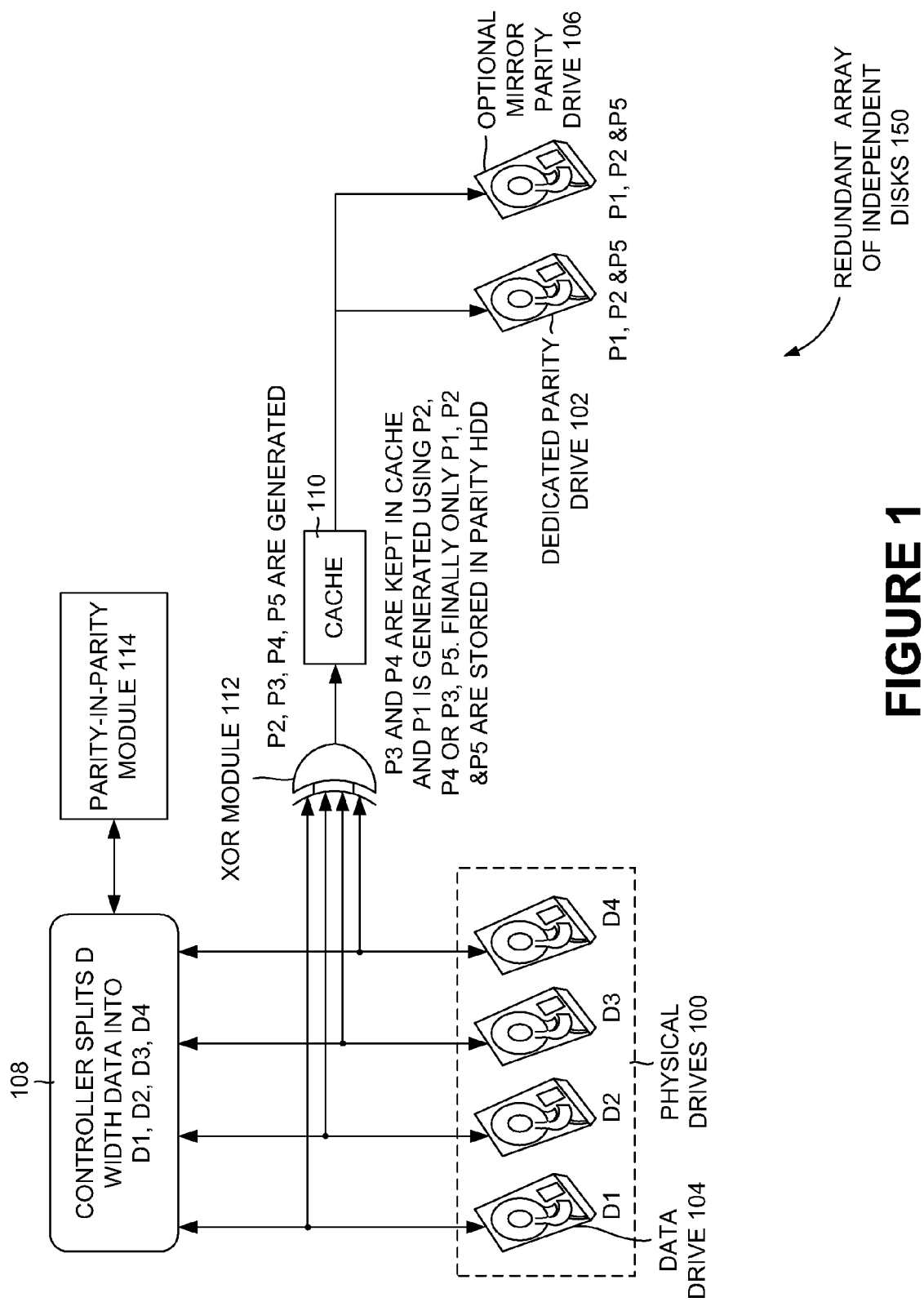
FIG. 1 is a system view of redundant array of independent disks, according to one embodiment.

In one embodiment, a method includes allocating three times a physical storage capacity of a data drive (e.g., the data drive 104 of FIG. 1) to a dedicated parity drive (e.g., the dedicated parity drive 102 of FIG. 1, may be part of a separate parity volume group having 'mirrored' physical drives) of a 'n' physical drives (e.g., the 'n' physical drives 100 of FIG. 1, may be of 4, 8, and 12 drives) of a redundant array of independent disks (e.g., the redundant array of independent disks 150 of FIG. 1), recovering n−1 physical drive failures of the 'n' physical drives 100 through a parity-in-parity technique (e.g., using the parity-in-parity module 114 of FIG. 1) in which only certain number of parities generated (e.g., P1, P2 and/or P5) during an initial write of a data may physically stored (e.g., may be in dedicated parity drive 102 of FIG. 1) and using an XOR function (e.g., using the XOR module 112 of FIG. 1) applied to the stored parities to recreate un-stored parities (e.g., P3 and P4 as illustrated in FIG. 1) which enable recovery of the n−1 physical drive failures.

In another embodiment, a system includes a redundant array of independent disks 150 to allocate three times a physical storage capacity of a data drive 104 to a dedicated parity drive 102 (e.g., may be part of a separate parity volume group having 'mirrored' physical drives), a cache (e.g., the cache 110 of FIG. 1, may store some parity data), a controller (e.g., the controller block as illustrated in FIG. 1) to split full width data (e.g., 'D' width data) into multiple smaller width data (e.g., D1, D2, D3, etc.), a parity-in-parity module (e.g., the parity-in-parity module 114 of FIG. 1) to recover n−1 physical drive failures of the 'n' physical drives 100 (e.g., may be of 4, 8, and 12 drives) through a parity-in-parity technique in which certain number of parities generated during an initial write of data may physically stored (e.g., may be in dedicated parity drive 102 of FIG. 1), and a XOR module (e.g., the XOR module 112 of FIG. 1) to apply XOR operation on the stored parities to recreate un-stored parities (e.g., using regeneration module 602 of FIG. 6) which enable recovery of the n−1 physical drive failures.

In yet another embodiment, a method of a recovering n−1 physical drive failure includes applying a parity-in-parity technique (e.g., using the parity-in-parity module 114 of Figure) to recover a redundant array of independent disks (e.g., the redundant array of independent disks 150 of FIG. 1), applying a XOR (e.g., using the XOR module 112 of FIG. 1) function through the parity-in-parity technique to generate un-stored parity (e.g., P3 and P4 as illustrated in FIG. 1) data from 'n' physical drives 100 and stored parity data (e.g., P1, P2 and/or P5 as illustrated in FIG. 1) and recreating the un-stored parities after a time interval that may be specified by a user.

FIG. 1 is a system view of redundant array of independent disks 150, according to one embodiment. Particularly, FIG. 1 illustrates physical drives 100, a dedicated parity drive 102, a data drive 104, an optional mirror parity drive 106, a controller block 108, a cache 110, an XOR module 112 and a parity-in-parity module 114, according to one embodiment.

The physical drives 100 may be a storage device which stores digitally encoded data (e.g., physical data of width 'D') on rapidly rotating platters with magnetic surfaces. The physical drives 100 may contain 'n' number for physical data volume group (e.g., D1, D2, D3 and/or D4 as illustrated in FIG. 1). The dedicated parity drive 102 may also be a storage device which stores parity data (e.g., P1, P2 and/or P5 as illustrated in FIG. 1). The parity bits may be binary digits which may be derived using an XOR module (e.g., the XOR module 112 of FIG. 1).

The data drive 104 may be part of the physical drives 100. The data drive 104 may have a part of data width from a data width of 'D' (e.g., D1 as illustrated in FIG. 1). The optional mirror parity drive 106 may be a storage device (e.g., hard disk, etc.) used to the store parity data similar to the dedicated parity drive 102. The optional mirror parity drive may have the content exactly of that dedicated parity drive (e.g., P1, P2, and/or P5 as illustrated in FIG. 1). The controller block 108 may be a logical block (e.g., may be a circuit, software code, an IC, a microcontroller, etc.) which splits the data width 'D' from the physical drives 100 into smaller widths (e.g., D1, D2, D3, D4, etc as illustrated in the FIG. 1).

The cache 110 may be a memory space used for collection of parity data (e.g., P1, P2, P3, P4 and/or P5 as illustrated in FIG. 1) computed earlier (e.g., using the XOR module 112 of FIG. 1). The cache 110 may be used to temporarily store parity data (e.g., P1, P2, etc.) to reduce the access time to fetch and/or to regenerate the parity data again later when required. The XOR module 112 may apply an XOR operation on the stored parities to recreate un-stored parities which enable recovery of the N−1 physical drive 100 failures. The parity-in-parity module 114 may recover N−1 physical drive 100 failures of the 'N' physical drives 100 through the parity-in-parity technique in which only certain ones of a number of parity data generated during an initial write of data are physically stored (e.g., may be in the dedicated parity drive 102 and/or in the optional mirror parity drive 106). The parity-in-parity technique may use the smaller data widths (e.g., D1, D2, D3, etc.), the XOR module 112 and/or the parity data (e.g., using P2, P3, P4, etc.) to generate the parity data (e.g., P1 using P2, P3, P4, etc.).

In example embodiment illustrated in FIG. 1, the controller block 108 may split the 'D' width data (e.g., from the physical drives 100) into smaller width data (e.g., D1, D2, D3, etc.). The smaller width data (e.g., D1, D2, D3, etc.) may be used for generating the parity data (e.g., P4, P2, P3, etc) using the XOR module 112 and the parity-in-parity module 114. The cache 110 may store the parity data (e.g., P3 and/or P4) temporarily and also the dedicated parity drive 102 and the optional mirror parity drive 106 stores selected parity data (e.g., P1, P2 and P5 as illustrated in the FIG. 1).

In one embodiment, three times a physical storage capacity of a data drive 104 may be allocated to a dedicated parity drive (e.g., may be part of a separate parity volume group having 'mirrored' physical drives) of a 'N' physical drives (e.g., may be 4, 8, and/or 12 drives) of a redundant array of independent disks. The N−1 physical drive failures of the 'N' physical drives may be recovered through the parity-in-parity technique in which only certain ones of a number of parity data generated during an initial write of data (e.g., may be most critical at a reach point of the time interval) are physically stored.

An XOR function applied to the stored parities may be used to recreate un-stored parities which enable recovery of the N−1 physical drive failures. Other aspects of the method may operate similarly to a RAID level 3 algorithm (e.g., A RAID 3 algorithm uses byte-level striping with a dedicated parity disk). The physical storage capacity may be three times the data drive 104 of the dedicated parity drive 102 when there are four physical data drives 100, the physical storage capacity may four times the data drive 104 of the dedicated parity drive 102 when there are six physical drives 100 and/or the physical storage capacity may six times the data drive 104 of the dedicated parity drive 102 when there are eight physical drives 100.

A redundant array of independent disks 150 may allocate three times a physical storage capacity of a data drive 104 to a dedicated parity drive 102 (e.g., that may be part of a separate parity volume group having 'mirrored' physical drives). The system may have a cache 110 (e.g., may store some parity data). A controller block 108 may split full width data (e.g., 'D' width data) into multiple smaller width data (e.g., D1, D2, D3, etc.). The parity-in-parity module 114 may recover N−1 physical drive 100 failures of the 'N' physical drives (e.g., may be 4, 8, and/or 12 drives) through the parity-in-parity technique in which only certain ones of a number of parity data generated during an initial write of data are physically stored (e.g., may be in dedicated parity drive 102 and/or optional mirror parity drive 106).

A XOR module 112 may apply XOR operation on the stored parities (e.g., P1, P2 and/or P5) to recreate un-stored parities (e.g., P3 and/or P4 as illustrated in FIG. 1) which may enable recovery of the N−1 physical drive 100 failures. The data may be most critical at a reach point of the time interval. The other aspects of the system may operate similarly to a RAID level 3 algorithm (e.g., A RAID 3 algorithm may uses byte-level striping with a dedicated parity disk). The physical storage capacity may be three times the data drive 104 of the dedicated parity drive 102 when there are four physical data drives 100, the physical storage capacity may be four times the data drive 104 of the dedicated parity drive 102 when there are six physical drives 100, and/or the physical storage capacity may be six times the data drive 104 of the dedicated parity drive 102 when there are eight physical drives 100.

A parity-in-parity technique may be applied to recover a redundant array of independent disks. The XOR function may be applied through the parity-in-parity technique to generate un-stored parity data (e.g., P3 and/or P4 as illustrated in the FIG. 1) from 'N' physical drives 100 and stored parity data (e.g., P1, P2 and/or P5 as illustrated in the FIG. 1). The un-stored parities may be recreated after a time interval that is specified by a user. Three times a physical storage capacity of a data drive 104 may be allocated to a dedicated parity drive 102 (e.g., that may be a part of a separate parity volume group having 'mirrored' physical drives) of the 'N' physical drives 100 of the redundant array of independent disks 150. A superior read/write access capability and/or a superior parity data redundancy may be created through the mirroring.

FIG. 2 is a process view illustrating various parameters, according to one embodiment. FIG. 2 discloses legend information illustrating various parameters, according to one embodiment. Particularly, FIG. 2 illustrates block 202, block 204, block 206, block 208, block 210, block 212, and block 214, according to one embodiment.

The block 202 explains parameter 'Y' as the number of parity data that may be generated during the initial write of data physically. The block 204 explains parameter 'X' as the number of parity data which may be virtually calculated and regenerated. The block 206 explains 'N' as the number of data that may be written physically. The block 208 explains the number of parity data which will be physically stored.

The block 210 states that (Y) numbers parity data (e.g., P2, P3, P4, P5 as illustrated in FIG. 1) may be calculated with (N) numbers of data written. The block 212 states that (Y-X) numbers of parities are stored physically and 'X' number of parity (e.g., P3, P4, etc. as illustrated in FIG. 1). The block 214 explains that these 'X' number of parity may temporarily stored in cache 110 and is regenerated whenever necessary using the data disks and physically stored (Y-X) parities.

In example embodiment illustrated in FIG. 2, 'Y' number of the parity data (e.g., may be P2, P3, P4, and P5) are calculated with 'N' numbers of data written (e.g., may be in dedicated parity drive 102 and/or optional mirror parity drive 106). 'Y-X' are parity data are stored physically (e.g., may be stored in dedicated parity drive 102 and/or in optional mirror parity drive 106 of FIG. 1) and 'X' number of parity may be P3, P4 (e.g., may be stored in cache 110 of FIG. 1). These P3 and/or P4 may be regenerated whenever necessary using the physical drives 100 and stored parity (e.g., using P1, P2, and/or P4).

Figure 3:
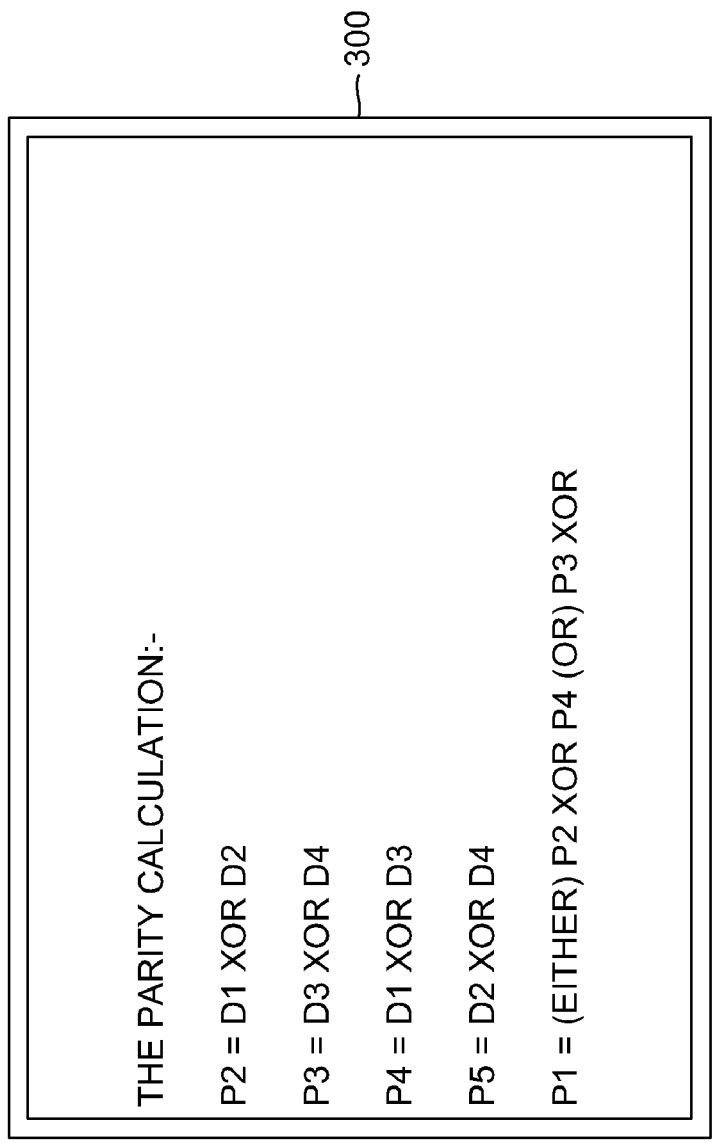
FIG. 3 is a block view illustrating parity calculation view using XOR operation on smaller data and parity data, according to one embodiment.

FIG. 3 discloses parity calculation view using XOR operation on smaller width data (e.g., D1, D2, D3, etc.) and parity data (e.g., P1, P2, P3, etc.), according to one embodiment. Particularly, FIG. 3 illustrates a block 300, according to one embodiment.

The block 300 illustrates parity calculation using the XOR calculation. The XOR operation may be a type of logical operation applied on the smaller width data (e.g., D1, D2, etc.) and/or the parity data (e.g., P1, P2, etc) that generates a particular parity data (e.g., P1 as illustrated in FIG. 3). Generally, an XOR operation is a type of logical disjunction on two operands that results in a value of "true" if and only if exactly one of the operands has a value of "true".

In example embodiment illustrated in FIG. 3, parity data P2 may be calculated using smaller width data D1 XORed with D2. Also, parity data P3 may be calculated using smaller width data D3 XORed with D4. Similarly parity data P4 and P5 may be calculated using smaller width data D1 XORed with D3 and D2 XORed D4 respectively. The parity data P1 is calculated using the parity data P2 XORed with P4 and/or P3 XORed with P5.

Figure 4:
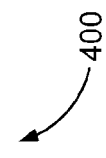
FIG. 4 is a XOR table view illustrating possible combinations of smaller width data and corresponding parity data generated using XOR operation on smaller width data and parity data, which can be written from the physical drives, according to one embodiment.

FIG. 4 is a XOR table view 400 illustrating possible combinations of smaller width data (e.g., D1, D2, D3, etc.) and corresponding parity data (e.g., P1 generated as a result of an XOR operation between D1 and D2) generated using the XOR operation on smaller width data (e.g., D1, D2, D3, etc.) and parity data (e.g., P1, P2, etc.), which can be written from the physical drives 100 as illustrated in FIG. 1, according to one embodiment. Particularly, FIG. 4 illustrates XOR table 400, according to one embodiment.

D1, D2, D3 and/or D4 are the smaller width data that may be generated by the controller from the physical drives 100. The parity data P2, P3, P4, and/or P5 are generated using the XOR operation on smaller width data D1, D2, D3, and/or D4. The parity data P1 can be generated either by using P2 XORed with P4 and/or P3 XORed with P5 as illustrated in FIG. 3.

In the example embodiment illustrated in FIG. 4, first column displays the values of smaller width data D1, second column displays the values of smaller width data D2. Similarly, third and fourth column displays the values of smaller width data D1 and smaller width data D2 respectively. Fifth column displays the values of the parity data D1, similarly sixth, seventh and eight column displays the values of the parity data P2, P3, P4, P5. The ninth column displays the result of XOR operation on the parity data P2 and P4. The tenth column displays the result of XOR operation on the parity data P3 and P5.

In the example embodiment, the table may display some possible small width data (e.g., D1, D2, D3 and D4), parity data (e.g., P2, P3, P4 and P5) and comparison of results in ninth and tenth column (e.g., the XOR operation between P2 and P4 and the XOR operation between P3 and P5) which may prove that P1 can be generated using any of the combinations (e.g., P2 XOR P4 and P3 XOR P5).

FIG. 5 discloses example illustrating a single case taken from FIG. 4, according to one embodiment. Particularly, FIG. 5 illustrates block 502, block 504, block 506 and block 508, according to one embodiment.

The block 502 explains that the result values of the parity data P2 XORed with P4 and the parity data P3 XORed with P5 remains the same, so one value may be used to represent the parity data P1. The block 502 also explains that Boolean expression may be formed using the unique property of XOR function which led to the result (e.g., same result from parity data P2 XORed with P4 and parity data P3 XORed with P5) as stated above.

The block 504 illustrates a unique case when the first three data drives 104 of the physical drives are lost, the regeneration of data using the parity data calculation. The block illustrates recovery of data using the XOR operation. Assuming no data from D1, D2 and D3 since they are lost, parity data may be calculated assuming the data for D4 as 1 or 0. The block 506 illustrates result of calculation of the parity data in a table form.

The block 508 explains that taking parity data (e.g., P1, P2 and/or P5) from the dedicated parity drive 102 and/or the optional mirror parity drive 106, parity data P3 and/or parity data P1 may be calculated from XOR operation on P2 and/or P4 and XOR operation on P3 and/or P5 respectively. The lost data may be generated using the four parity values (e.g., P2, P3, P4 and P5) and a small width data (e.g., D4) from the data drive 104.

In the example embodiment illustrated in FIG. 5, the small width data D1, D2, D3 are assumed to be lost and the data from the remaining data drive 104 D4 may be assumed as 0. The parity data P2 results to be 1 as P2 equals D1 XOR with D2. The parity data P3 results to be 1 as P3 equals D3 XOR with D2. The parity data P4 results to be 0 as P4 equals D1 XOR with D3. The parity data P5 results to be 0 as P2 equals D2 XOR with D4. The parity data P1 results to be 1 as P1 equals P2 XOR with P4 and/or P1 also equals P3 XOR P5. The lost data may be generated using parity data (e.g., P1, P2, P3 and P4) and using the remaining small width data (e.g., D4 as illustrated in FIG. 5).

Figure 6:
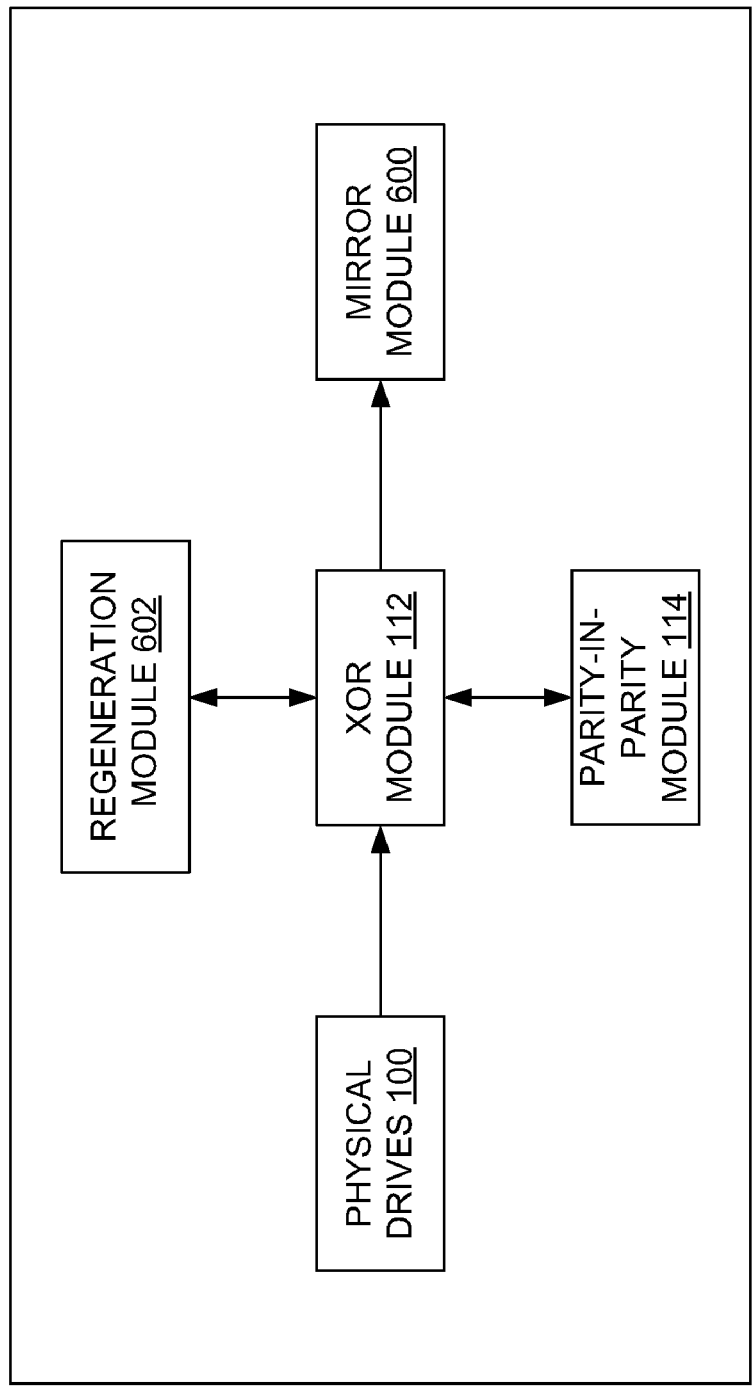
FIG. 6 is a block diagram of a controller, according to an alternate embodiment.

FIG. 6 is a block diagram of a controller 608, according to an alternate embodiment. The controller 608 may be similar to the controller 108 of FIG. 1, but may have functionality that combines separate modules. For example, FIG. 6 illustrates mirror module 600 and regeneration module 602, according to one embodiment.

The mirror module 600 may create a superior read/write access capability and a superior parity data redundancy through the mirroring. The regeneration module 602 may recreate the un-stored parities after a time interval that is specified by a user.

In the example embodiment illustrated in FIG. 6, the physical drives 100 are connected to XOR module 112, which may be controlled by parity-in-parity module 114 and/or the regeneration module 602 as per the requirements to generate the parity data (e.g., P1, P2, P3, etc.)

In one embodiment, a superior read/write access capability and a superior parity data redundancy may be created through the mirroring. The un-stored parities may be recreated after a time interval that is specified by a user. The regeneration module 602 may recreate the un-stored parities after a time interval that is specified by a user. A mirror module 600 may create a superior read/write access capability and a superior parity data redundancy through the mirroring.

Figure 7:
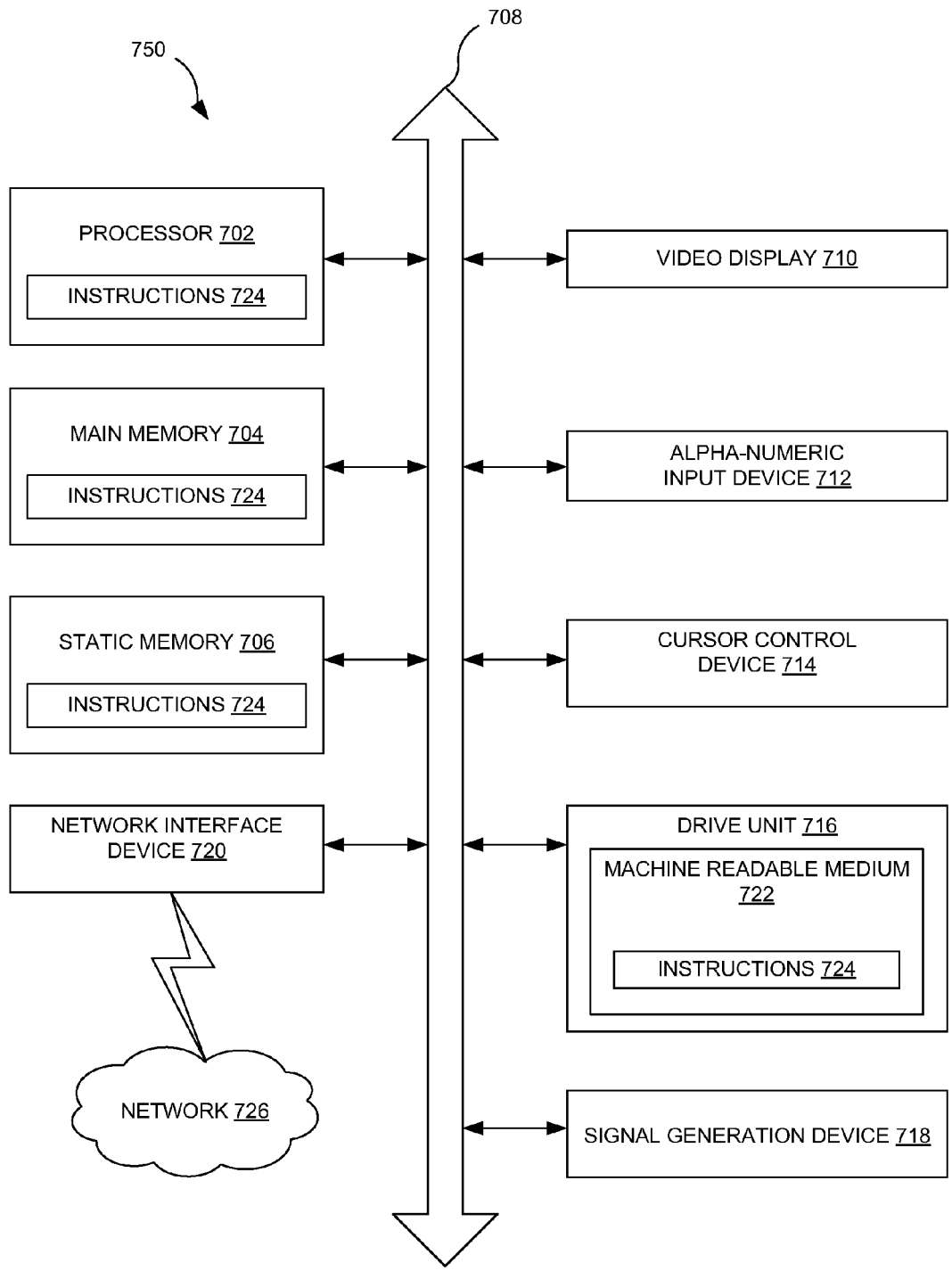
FIG. 7 is a diagrammatic system view of a data processing system in which any of the embodiments disclosed herein may be performed, according to one embodiment.

FIG. 7 is a diagrammatic system view 750 of a data processing system in which any of the embodiments disclosed herein may be performed, according to one embodiment. Particularly, the diagrammatic system view 750 of FIG. 7 illustrates a processor 702, a main memory 704, a static memory 706, a bus 708, a video display 710, an alpha-numeric input device 712, a cursor control device 714, a drive unit 716, a signal generation device 718, a network interface device 720, a machine readable medium 722, instructions 724 and a network 726, according to one embodiment.

The diagrammatic system view 700 may indicate a personal computer and/or a data processing system in which one or more operations disclosed herein may be performed. The processor 702 may be a microprocessor, a state machine, an application-specific integrated circuit, a field programmable gate array, etc. (e.g., Intel® Pentium® processor). The main memory 704 may be a dynamic random access memory and/or a primary memory of a computer system. The static memory 706 may be a hard drive, a flash drive, and/or other memory information associated with the data processing system.

The bus 708 may be an interconnection between various circuits and/or structures of the data processing system. The video display 710 may provide graphical representation of information on the data processing system. The alpha-numeric input device 712 may be a keypad, a keyboard and/or any other input device of text (e.g., a special device to aid the physically challenged). The cursor control device 714 may be a pointing device such as a mouse.

The drive unit 716 may be the hard drive, a storage system, and/or other longer term storage subsystem. The signal generation device 718 may be a bios and/or a functional operating system of the data processing system. The network interface device 720 may be a device that may perform interface functions such as code conversion, protocol conversion and/or buffering required for communication to and from a network 726.

The machine readable medium 722 may provide instructions on which any of the methods disclosed herein may be performed. The instructions 724 may provide source code and/or data code to the processor 702 to enable any one or more operations disclosed herein.

Figure 8:
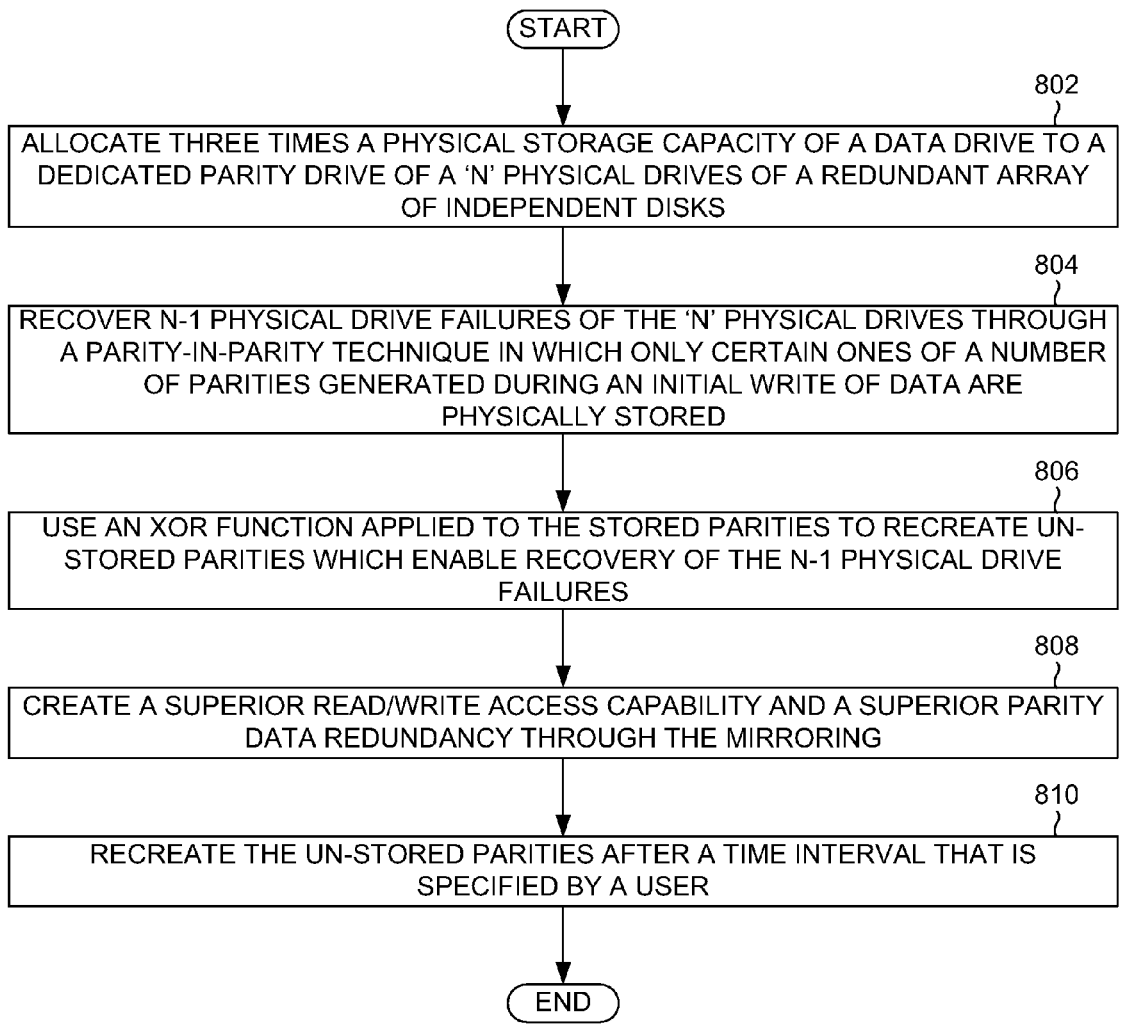
FIG. 8 is a process flow of recovering N−1 physical drive from 'N' physical drives through a parity-in-parity technique by generating parity data, according to one embodiment.

FIG. 8 is a process flow of recovering N−1 physical drive from 'N' physical drives 100 through a parity-in-parity technique by generating parity data, according to one embodiment. In operation 802, three times a physical storage capacity of a data drive may be allocated to a dedicated parity drive (e.g., the dedicated parity drive 102 of FIG. 1) of an 'n' physical drives (e.g., the physical drive 100 of FIG. 1, may be of 4, 8, and 12 drives) of a redundant array of independent disks (e.g., as illustrated in FIG. 1). In operation 804, n−1 physical drive failures of the 'n' physical drives 100 may be recovered through a parity-in-parity technique (e.g., using the parity-in-parity module 114 of FIG. 1) in which a number of parities generated during an initial write of a data physically stored (e.g., may be stored in dedicated parity drive 102 and/or in optional mirror parity drive 106 of FIG. 1).

In operation 806, an XOR function applied (e.g., using the XOR module 112 of FIG. 1) to the stored parities may be used to recreate un-stored parities (e.g., using regeneration module 602 of FIG. 6) which enable recovery of the n−1 physical drive failures. In operation 808, a superior read/write access capability and/or a superior parity data redundancy may be created through the mirroring (e.g., using the mirror module 604 of FIG. 6). In operation 810, the un-stored parities (e.g., P3 and/or P4 as illustrated in FIG. 1) may be recreated (e.g., using the regeneration module 602 of FIG. 6) after a time interval that may be specified by a user.

Figure 9:
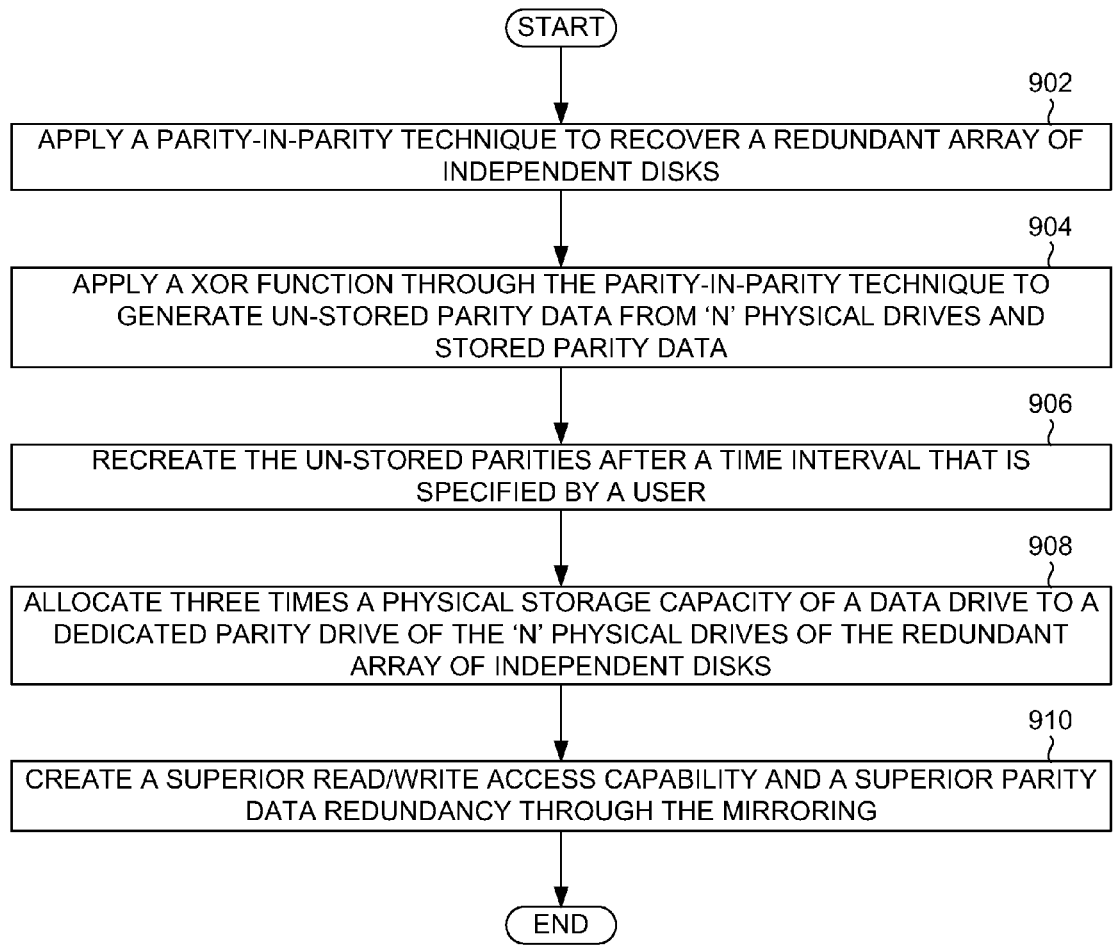
FIG. 9 is a process flow of recovering a redundant array of independent disks by applying a parity-in-parity technique, according to one embodiment.

FIG. 9 is a process flow of recovering a redundant array of independent disks 150 by applying a parity-in-parity technique, according to one embodiment. In operation 902, parity-in-parity technique may be applied to recover a redundant array of independent disks (e.g., using the parity-in-parity module 114 of FIG. 1). In operation 904, a XOR function may be applied (e.g., using the XOR module 112 of FIG. 1) through the parity-in-parity technique to generate un-stored parity data from 'n' physical drives and stored parity data.

In operation 906, the un-stored parities may be recreated (e.g., using the regeneration module 602 of FIG. 6) after a time interval that may be specified by a user. In operation 908, three times a physical storage capacity of a data drive may be allocated to a dedicated parity drive (e.g., may be the part of a separate parity volume group having 'mirrored' physical drives) of the 'n' physical drives 100 of the redundant array of independent disks. In operation 910, a superior read/write access capability and a superior parity data redundancy may be created through the mirroring (e.g., using the mirror module 604 of FIG. 6).

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., Application Specific Integrated Circuitry (ASIC) and/or in Digital Signal Processor (DSP) circuitry).

For example, the parity-in-parity module 114, the XOR module 112, the regeneration module 600, the mirror module 602 and/or other modules of FIGS. 1-9 may be enabled using parity-parity circuit, an XOR circuit, a recreation circuit, a mirror circuit, and/or other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order.

The modules in the figures are shown as distinct and communicating with only a few specific module and not others. The modules may be merged with each other, may perform overlapping functions, and may communicate with other modules not shown to be connected in the Figures. Accordingly, the specification and drawings are to be regarded in an illustrative rather than a restrictive sense.

What is claimed is:

1. A method, comprising:
    allocating at least three times a physical storage capacity of a data drive to a dedicated parity drive of a 'n' physical drives of a redundant array of independent disks; and
    recovering n−1 physical drive failures of the 'n' physical drives through a parity-in-parity technique in which only certain ones of a number of parities generated during an initial write of data are physically stored; and
    using an XOR function applied to the stored parities to recreate un-stored parities which enable recovery of the n−1 physical drive failures.

2. The method of claim 1 wherein the dedicated parity drive is part of a separate parity volume group having 'mirrored' physical drives.

3. The method of claim 2 further comprising: creating a superior read/write access capability and a superior parity data redundancy through the mirroring.

4. The method of claim 2 further comprising: recreating the un-stored parities after a time interval that is specified by a user.

5. The method of claim 4 wherein the data is most critical at a reach point of the time interval.

6. The method of claim 1 wherein other aspects of the method operate similarly to a RAID level 3 algorithm.

7. The method of claim 6 wherein the 'n' physical drives are at least one of 4, 8, and 12 drives.

8. The method of claim 1 wherein the physical storage capacity is three times the data drive of the dedicated parity drive when there are four physical data drives, wherein the physical storage capacity is four times the data drive of the dedicated parity drive when there are six physical drives, and wherein the physical storage capacity is six times the data drive of the dedicated parity drive when there are eight physical drives.

9. The method of claim 1 in a form of a machine-readable medium embodying a set of instructions that, when executed by a machine, causes the machine to perform the method of claim 1.

10. A system of enhanced RAID level 3, comprising:
    a redundant array of independent disks to allocate at least three times a physical storage capacity of a data drive to a dedicated parity drive;
    a cache;
    a controller to split full width data into multiple smaller width data;
    a parity-in-parity module to recover n−1 physical drive failures of the 'n' physical drives through a parity-in-parity technique in which only certain ones of a number of parities generated during an initial write of data are physically stored; and
    a XOR module to apply XOR operation on the stored parities to recreate un-stored parities which enable recovery of the n−1 physical drive failures.

11. The system of claim 10, wherein the dedicated parity drive is part of a separate parity volume group having 'mirrored' physical drives.

12. The system of claim 11, further comprising: a regeneration module to recreate the un-stored parities after a time interval that is specified by a user.

13. The system of claim 12, wherein the data is most critical at a reach point of the time interval.

14. The system of claim 11, further comprising: a mirror module to create a superior read/write access capability and a superior parity data redundancy through the mirroring.

15. The system of claim 10, wherein other aspects of the system operate similarly to a RAID level 3 algorithm.

16. The system of claim 15, wherein the 'n' physical drives are at least one of 4, 8, and 12 drives, and wherein the cache to store at least some parity data.

17. The system of claim 10, wherein the physical storage capacity is three times the data drive of the dedicated parity drive when there are four physical data drives, wherein the physical storage capacity is four times the data drive of the dedicated parity drive when there are six physical drives, and wherein the physical storage capacity is six times the data drive of the dedicated parity drive when there are eight physical drives.

18. A method of a recovering n–1 physical drive failures, comprising:

applying a parity-in-parity technique to recover a redundant array of independent disks;

applying a XOR function through the parity-in-parity technique to generate un-stored parity data from 'n' physical drives and stored parity data; and recreating the un-stored parities after a time interval that is specified by a user.

19. The method of claim 18 further comprising allocating at least three times a physical storage capacity of a data drive to a dedicated parity drive of the 'n' physical drives of the redundant array of independent disks, wherein the dedicated parity drive is part of a separate parity volume group having 'mirrored' physical drives.

20. The method of claim 19 further comprising:

creating a superior read/write access capability and a superior parity data redundancy through the mirroring.

* * * * *